(12) United States Patent
Mattejat et al.

(10) Patent No.: US 6,896,990 B2
(45) Date of Patent: May 24, 2005

(54) DEVICE FOR CONNECTING AT LEAST TWO FUEL CELL BATTERIES AND CORRESPONDINGLY CONNECTED PLANT

(75) Inventors: Arno Mattejat, Bubenreuth (DE); Karl Strasser, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 175 days.

(21) Appl. No.: 10/059,543

(22) Filed: Jan. 29, 2002

(65) Prior Publication Data

US 2002/0094476 A1 Jul. 18, 2002

Related U.S. Application Data

(63) Continuation of application No. PCT/DE00/02069, filed on Jun. 26, 2000.

(30) Foreign Application Priority Data

Jul. 29, 1999 (DE) .......................................... 199 35 764

(51) Int. Cl.[7] .............................................. H01M 8/04
(52) U.S. Cl. .............................. 429/38; 429/22; 429/34
(58) Field of Search .............................. 429/34, 38, 39, 429/32, 22

(56) References Cited

U.S. PATENT DOCUMENTS

| 5,543,240 | A | 8/1996 | Lee et al. | |
| 6,372,372 | B1 * | 4/2002 | D'Aleo et al. | 429/34 |
| 6,613,470 | B1 * | 9/2003 | Sugita et al. | 429/38 |

FOREIGN PATENT DOCUMENTS

| EP | 0 981 175 A2 | 2/2000 |
| WO | WO 96/07211 | 3/1996 |

* cited by examiner

Primary Examiner—John S. Maples
(74) Attorney, Agent, or Firm—Laurence A. Greenberg; Werner H. Stemer

(57) ABSTRACT

A device connects at least two fuel cell batteries. Moreover, a plant includes the device. In order to connect a plurality of batteries containing fuel cells in a clearly understandable way and for easy mounting, each battery is assigned a junction block with T-pieces. The T-pieces in each case form a stub line to a collecting line and are coupled to the battery or (for example, via connecting elements) to one another via flanges. The flanges are preferably integrated to form junction flange plates and coupling flange plates.

59 Claims, 9 Drawing Sheets

DEVICE FOR CONNECTING AT LEAST TWO FUEL CELL BATTERIES AND CORRESPONDINGLY CONNECTED PLANT

CROSS-REFERENCE TO RELATED APPLICATION

This application is a continuation of copending International Application No. PCT/DE00/02069, filed Jun. 26, 2000, which designated the United States.

BACKGROUND OF THE INVENTION

FIELD OF THE INVENTION

The invention relates to a device for connecting at least two fuel cell batteries and to a plant in which a plurality of such batteries are connected to one another.

Electrical energy can be generated with particularly high efficiency by introducing hydrogen (or a hydrogen-containing medium, for example, a hydrocarbon) into one volume and oxygen (or an oxygen-containing medium, for example, air) into another volume, and by cold-burning these two fuels at a diaphragm that separates the two volumes and across which diffusion processes take place, in such a way that an electrical potential occurs in the diaphragm. This potential is picked up via metallic parts. A corresponding fuel cell unit therefore requires a supply of the two fuels, the two volumes with the diaphragm inserted between them, a discharge of the fuels out of the two volumes and a gastight encasing of the volumes, supplies and discharges, and also electrical terminals for the picked-up electrical potential. In this case, a fuel cell unit of this type can deliver only a low potential and a limited current and therefore a plurality of such units are connected electrically in series to generate higher voltage and connected electrically in parallel to generate high currents. This results in a module (for example, a planar, plate-shaped construction of the units in a block) that can be used as an electrical battery and in each case itself possesses junctions for the process media, (that is to say the supplied and discharged, generally gaseous substances of each unit). Heat exchangers are normally also included. The heat exchangers heat the supplied process media with the heat of the discharged process media. A battery of this type also is particularly thermally insulated.

The supply of voltage to most consumers requires a power that can be best achieved by a modular set-up of the voltage supply plant, that is to say by a parallel and/or series connection of a plurality of batteries. In the event of a defect in individual fuel cells, only the defective battery must be exchanged and/or repaired.

A plant utilizing batteries of this type includes a multiplicity of tubes or hoses with valves (if appropriate, also temperature sensors) for individual actions on the processes of individual batteries, branches (in particular, T-pieces) and connecting elements that lead to the corresponding tanks or main lines of the process media to be supplied and exhaust-gas lines for the process media to be discharged. This results in a complex connection system with a bewildering number of junctions and line segments (if appropriate, with process engineering equipment), which is not only designed individually, but also has to be released for service or repair purposes and reassembled. In addition, in the spatial configuration of a plurality of interconnected batteries, in each case only the front and/or rear end face of a battery is accessible in order to make junctions. To remove an individual battery from this composite structure, not only the junctions of this battery then have to be released, but the junctions and connecting lines of other batteries also have to be released, in so far as these other lines run along the end face of the battery to be removed and prevent the removal of the battery. Moreover, there is mostly insufficient space available on the two end faces of the battery to remove a battery selectively on one side or the other.

SUMMARY OF THE INVENTION

It is accordingly an object of the invention to provide a device for connecting at least two fuel cell batteries and a correspondingly connected plant that overcome the hereinafore-mentioned disadvantages of the heretofore-known devices of this general type and that improve the junction technology of fuel batteries in such multiple plants, in such a way that the individual batteries can be connected to one another and interlinked with one another in a simple and space-saving way.

With the foregoing and other objects in view, there is provided, in accordance with the invention, a device interconnects first and second fuel cell batteries. The device includes junction blocks each assigned to a respective one of the batteries. Each of the junction blocks include a collecting line with ends, a stub line having a free end, and leading to the collecting line and a junction flange at the free end of the stub line. First coupling flanges are included. Each coupling flange is disposed at one of the ends of the collecting line of a respective one of the blocks. Second coupling flanges are included and are each disposed at the other of the ends of the collecting line of a respective other of the blocks. Flexible connecting lines each couple one of the first coupling flanges to one of the second coupling flanges.

With the objects of the invention in view, there is also provided a plant. The plant includes a first and a second cell battery, a respective junction block for each of the batteries. A respective collecting line is in each of the respective junction blocks. Each of the collecting lines having two ends. A respective stub line for each collecting line leads from the respective collecting line to the respective battery. A first coupling flange connects to one end of the respective collecting line. A second coupling flange connects to the other end of the respective connecting line. A flexible connecting line couples the first coupling flange of the first cell battery to the second coupling flange of the second battery.

In accordance with a further object of the invention, each fuel cell battery is provided with a junction block that has at least one junction flange for the battery and, as a rule, two connecting flanges for connection in each case to an adjacent junction block or to connecting elements disposed between them. Parts of the supply lines are disposed in a compact way in the junction block. The junction blocks can be disposed one above the other or next to one another; this saves spaces and increases flexibility of the set up.

The junction blocks contain stub lines to T-pieces in collecting lines, so that there is no need for any branch elements, such as T-pieces and the like, between the junction blocks.

In accordance with a further object of the invention, an overall main line can initially be divided for each process medium (for example, in each case, from an air compressor and from a hydrogen tank to a spent-air chimney and also from and to a cooling-water circulating pump) into individual sections. Each section constitutes a specific main line that is formed from mutually coupled collecting lines of the individual junction blocks. On such an individual main line, the junction block of the first battery then needs to possess only a single coupling flange for coupling its collecting line, while all the further junction blocks in each case have a coupling flange at both ends of their collecting line. A stub line then leads from this main section in each block to a corresponding junction of the battery. The batteries can thereby be disposed in rows, each with a main line, and an easily understandable spatial pattern for disposing the batteries and an easily understandable line system can be formed from a plurality of main lines having the batteries disposed in rows.

In one embodiment, the junction blocks have at least one flange plate for connecting to a further flange plate in which the corresponding junctions of a battery are integrated. The junction block can thus be coupled to the flange plate of the battery in a simple way. Accordingly, a reliable and quick connection between the junction block and the battery and the supply lines guided can be made. In the event of a renewed assembly of the junction block and flange plate, it is therefore necessary merely to check this connection point for leakages.

In another embodiment, the junction block is integrated into one end face of the associated battery. The battery and junction block thus constitute a permanently connected unit. As a result, the number of seals (and of possible leakage points) and the number of components to be demounted are reduced.

However, the supply lines of the batteries (above all, the discharge lines for the process media which have occurred, since leakage points are less critical there) may also be connected to the corresponding block via plug connections capable of being actuated in a simple way.

Expediently, connecting elements are provided between the junction blocks in order to preserve some flexibility in the interconnection despite the compact form of construction.

The connecting elements also serve for reliably connecting the possibly differently spaced junction blocks to one another.

The connecting elements may be of flexible construction: that is, to allow a movement off the junction blocks in relation to one another. Mounting offsets between the fuel cell blocks and/or modules can consequently be compensated, and, in particular, it is advantageous if the length of a connecting element is flexible, for example by corrugated hoses being pressed together or drawn apart. Moreover, flexible connecting elements can easily be installed during mounting, by being temporarily pressed together or bent. When connecting elements are pressed together during mounting and partially relax in the installed state, they press even with some sealing effect onto the counterflanges. On account of the flexibility, the connecting elements can likewise be removed more easily during demounting.

In order to achieve the flexibility of the connecting elements, the connecting elements may have a wave-like or rib-like shape at least on specific regions. These wave-like regions then ensure the desired flexibility when the connecting elements are inserted, but also at the same time afford some stability in the inserted state.

The connecting elements advantageously have a flange plate that is coupled to the one junction flange of the junction block at at least one end. The respective connecting element, typically designed as a tube, is in this case advantageously welded to the flange plate, in order to obtain a reliable and leaktight connection. The connecting elements thus constitute, together with the flange plates, a media coupling between the individual junction blocks, which is easy to mount, and which also has few sealing points.

Advantageously, sealing elements are provided between the junction block and the respective flange plate of the coupling (junction flange or coupling flange) or the fuel cell block.

Flat seals, which are stamped into shape if appropriate, are possible as a sealing element. The flat seals are matched with their entire width to the sealing surface.

The sealing elements may also be O-ring seals lying in grooves that are worked into one of the flanges or of the solid flange plates. The O-ring seals can thus be exchanged in a simple way during demounting.

However, it is also possible to insert between a flange plate and the corresponding counterflange a carrier plate that includes a composite elastomeric material and in which seals are directly worked in. Where O-rings are concerned, therefore, the carrier plate determines, for example, the deformation path. Elastomers and shaped parts may also be vulcanised in or adhesively bonded in.

Expediently, the junctions of the stub lines or collecting lines may be disposed in a space-saving way in the flange plates. That is, they may lie near to one another. This configuration is conducive to the compact form of construction and simplifies the mounting and demounting of individual components.

The diameters of the stub lines that are connected to a battery may be dimensioned such that they sufficiently supply the corresponding process medium to or sufficiently discharge the corresponding process medium from only the batteries connected to them. In particular, junction flanges may narrow the diameter of the stub lines to limit throughput required by the battery connected to them.

The diameters of the collecting lines in the junction blocks and of the connecting elements are expediently constructed in terms of the requirement of the entire fuel cell plant. Thus, with an unchanged junction size of the stub lines at the battery, influence can be exerted on pressure losses, uniformity of quantity distribution and flow noises by a size variation (for example, by a selection from standardized sizes) of the diameters in the main section.

The lines between the battery, T-pieces and flanges may be provided in the form of hoses or tubes. The use of hoses also ensures a flexible connection between the battery and the junction block.

In addition, valves, measuring instruments (for example, temperature sensors, exhaust-gas measuring equipment, etc.) or other process engineering apparatuses may be installed in the supply lines. This makes possible, inter alia, individual matching to the current supply requirement and process management in a battery.

A further advantage of this device is that even coaxial double-casing tubes can be connected without difficulty. Thus, in specific surroundings, it is necessary, for example, to prevent the hydrogen necessary for operation from passing out of the tube system into the surroundings. This is normally achieved by carrying hydrogen in double-casing tubes in which the outer space is controllable.

Reliable sealing-off during the connection of a double-casing tube to a flange may include a shaped part having two coaxially disposed sealing rings that are connected to webs.

For noise reduction, the connecting elements can be at least partially lined with flexible material, in particular at shafts, transitions, or offsets. The offset between the flange and junction block may also be correspondingly lined for noise reduction. The flexible material must in this case be selected in a thickness such that the flexibility of the connecting elements is not impaired.

Advantageously, the connecting elements may be lined completely with flexible material and at the same time also expediently be shaped in such a way that the flow profile is as smooth as possible.

The flexible material selected may be, for example, an elastomer that abuts smoothly against the inner wall of the connecting element.

Advantageously, selfclosing equipment (for example, nonreturn valves) may be provided in junction blocks, connecting elements and/or the flanges, the equipment closing, for example during the demounting of a sealing point, and thereby preventing cooling water from running out or hydrogen from escaping.

Other features that are considered as characteristic for the invention are set forth in the appended claims.

Although the invention is illustrated and described herein as embodied in a device for connecting at least two fuel cell batteries and a correspondingly connected plant, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
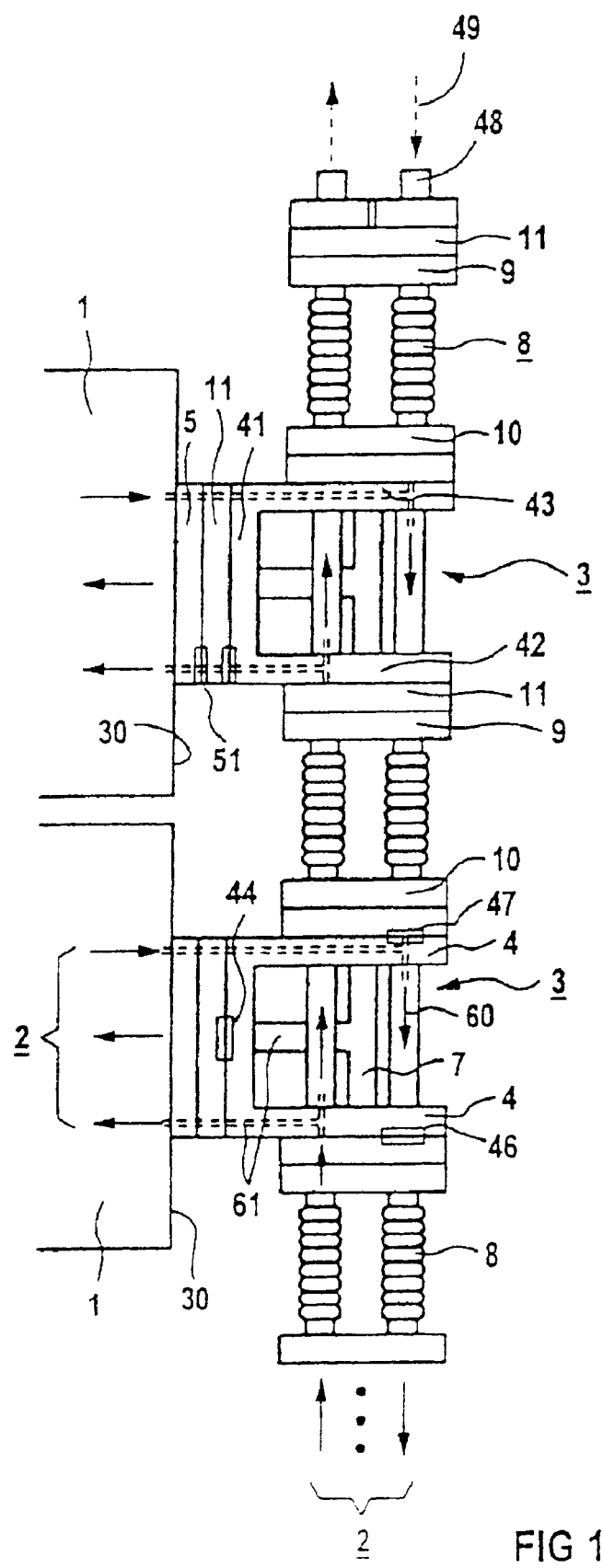
FIG. 1 is a diagrammatic, partial side view showing a plant with at least two fuel cell batteries.
Figure 2:
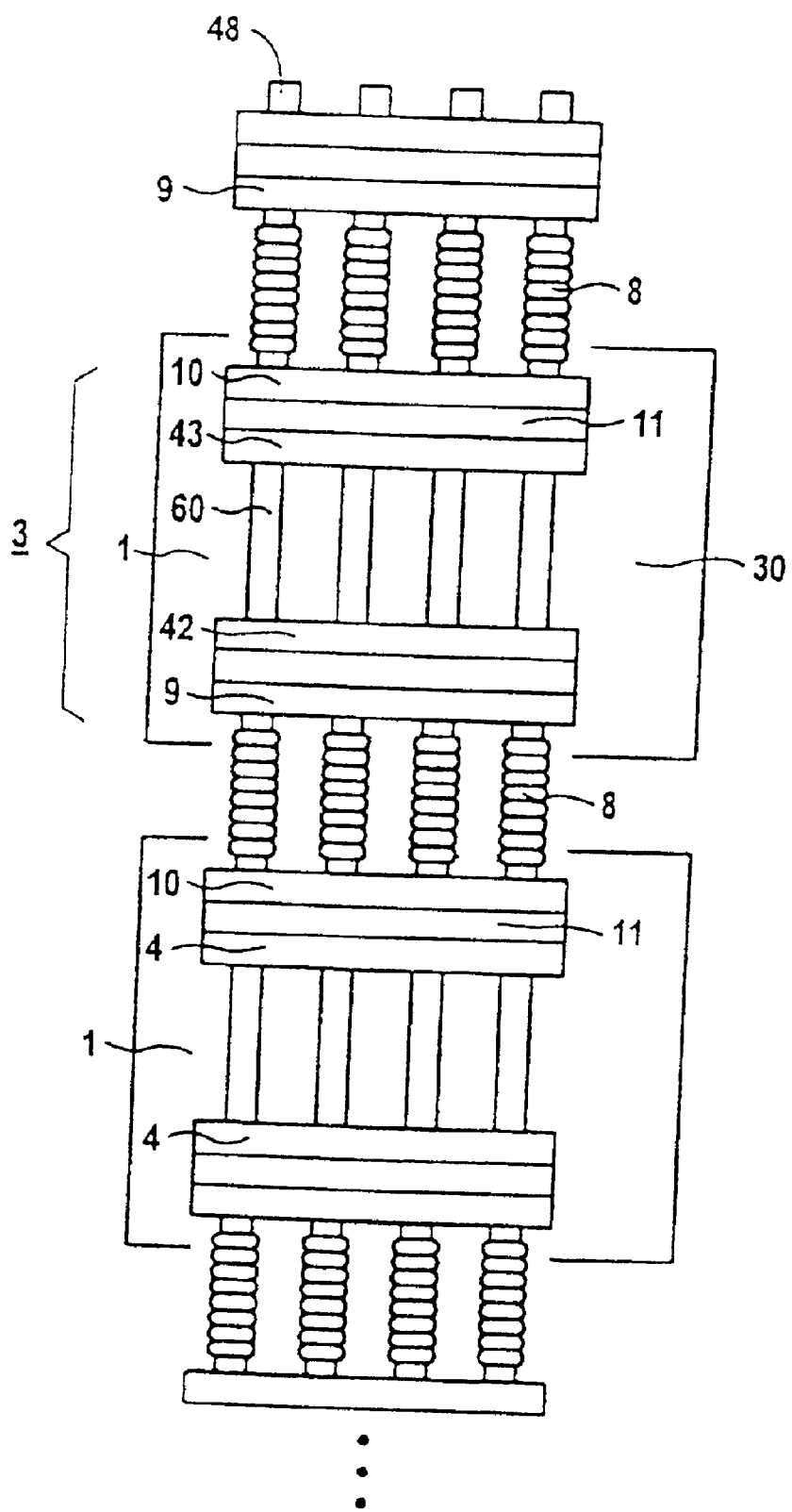
FIG. 2 is a front view showing the plant from FIG. 1.

Referring now to the figures of the drawings in detail and first, particularly to FIGS. 1 and 2 thereof, two adjacent fuel cell batteries 1 of a plant are shown. Further batteries can be connected to these batteries 1 upwardly and downwardly: i.e., a row of batteries disposed one behind the other. Moreover, further batteries of one or more further rows may be concealed by the batteries 1 of FIG. 1, in which case a row of batteries lying next to the batteries 1 could be seen in FIG. 2, but is not illustrated.

These batteries require junctions for the supply of the oxygen-containing process medium and of the hydrogen-containing process medium, for the discharge of the process media (exhaust gases) occurring in the batteries, and for the supply and discharge of cooling water. These junctions are located in each case on an end face 30 of the batteries 1 that points in the same direction. In this case, the arrows 2 indicate a system of supply lines that leads through the side faces 30 of the batteries 1 and through their insulation to the fuel cell units in the batteries and to corresponding supply equipment (for example, a compressor for air, a storage tank for hydrogen-containing fuel gas). In each case, a disposal plant for the exhaust gases occurring in the two volumes of the fuel cells (for example, for the catalytic residual combustion of hydrogen and fuel gas and/or for the separation of process water occurring at the same time), to cooling-water pressure pumps and to a collecting tank for the cooling water. In this case, the figures do not illustrate that the supply equipment may each be preceded by line branches, in order to form for each row altogether six line systems, each with a main section.

FIGS. 1 and 2 show that these main sections coming from the supply equipment are formed by junction blocks 3 and connecting elements 8 that are located between them. The connecting elements 8 also form the junction for the batteries 1.

Thus, the junction blocks 3 in each case carry three flange plates 4, to be precise a lateral junction plate 41, for connection to a corresponding flange plate 5 ("counterflange") of the battery 1 assigned in each case to the junction block 3, and in each case a first coupling flange plate 42 and a second coupling flange plate 43, the first coupling flange plate 42 being coupled, in each case via a sealing element 11, to the second coupling flange plate 43 of an adjacent junction block.

Only the junction block that is assigned to the first battery of a row does not require any junction flanges for coupling to a further junction block, because that junction block is located at the end of a main section. Instead, this block can also carry, on the side located opposite the first junction flange, in each case, only one closure of the respective main supply section. However, FIG. 1 illustrates that all the junction blocks have the same set-up. Therefore, the first junction block is connected likewise to a connecting element 8, but each main supply section being closed by a closing cap 48. However, these closing caps 48 may also be placed directly onto the second coupling flange plate 43 of a junction block, without a connecting element 8 being interposed, if this block is not to be connected to a block of a further battery, as indicated by the arrows 49.

Each junction block 3 contains, to form a main supply section, a collecting line 60 with a stub line 61, one end of which leads into the collecting line 60 and the free other end that is coupled to a junction of a battery 1. The free end of each stub line 61 correspondingly carries a junction flange 44, the figures illustrating the advantageous embodiment in which all the junction flanges 44 are combined to form a common flange plate, to be precise the junction flange plate 41 have already been mentioned.

One end of each collecting line 60 also issues correspondingly into a coupling flange 46, 47, and likewise, in the preferred embodiment illustrated, these coupling flanges 46, 47 are integrated on either side of each block 3 into a flange plate, to be precise the first coupling flange plate 42 mentioned. The second coupling flange plates 43 also in a similar way form in each case the integrated components for forming in each case a coupling flange at the other end of each collecting line, in so far as the junction block at all requires a second coupling flange for flanging to a first coupling flange of another battery. The main part of each block is therefore, in each case, T-pieces 7 that simultaneously form a collecting line and a stub line. They issue into corresponding coupling flanges and junction flanges and/or into flange plates with passages for the collecting lines, and these flange plates may also have integrated into them at the same time stub lines which emanate from the leadthroughs of the connecting lines and lead to the junctions and junction flanges of the battery.

The connecting elements 8 themselves carry in each case a connecting line and in each case coupling flanges ("counterflanges") for coupling to the junction blocks. Advantageously, the coupling flanges of the connecting elements 8 are also integrated to form corresponding coupling flange plates 9, 10. Connecting elements are necessary, however, only in the situation where, because of the spatial extent of the batteries 1 and of the blocks 3, it is not possible to couple the coupling flanges of the blocks directly to one another and seal them off only via flat seals, O-rings or similar sealing elements 11.

Figure 3:
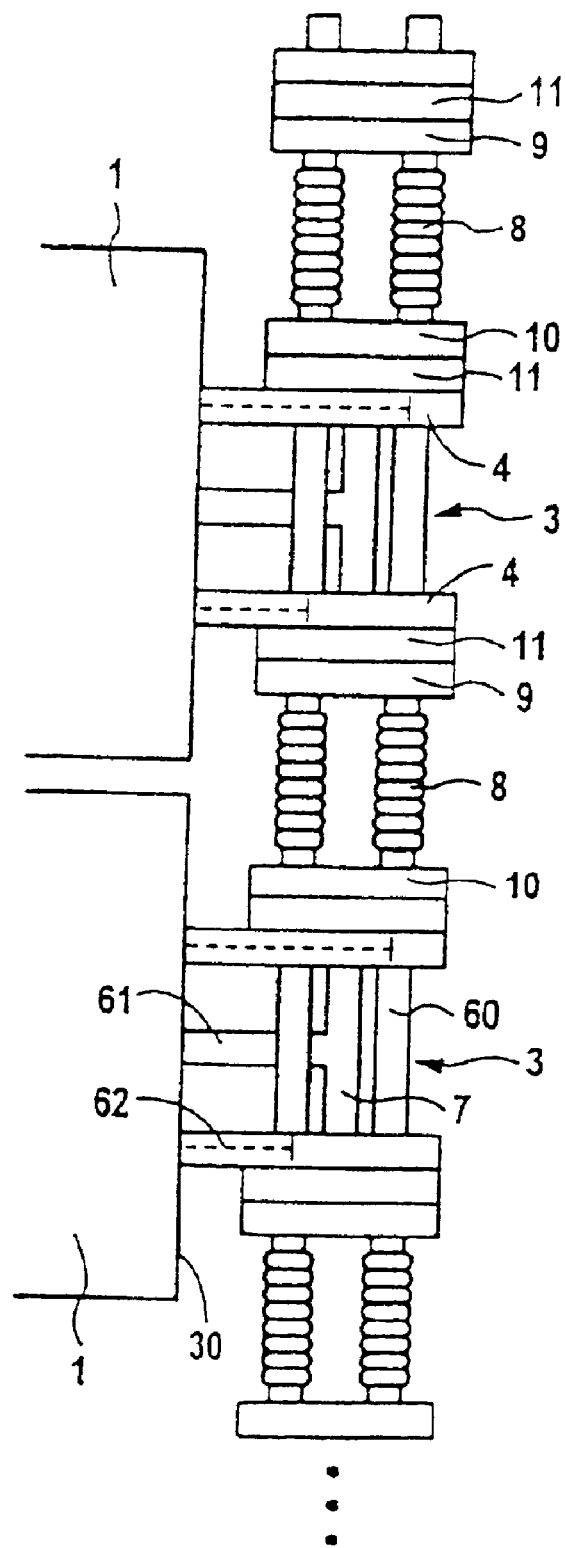
FIG. 3 is a partial side view showing a second embodiment of a plant with at least two fuel cell batteries.
Figure 4:
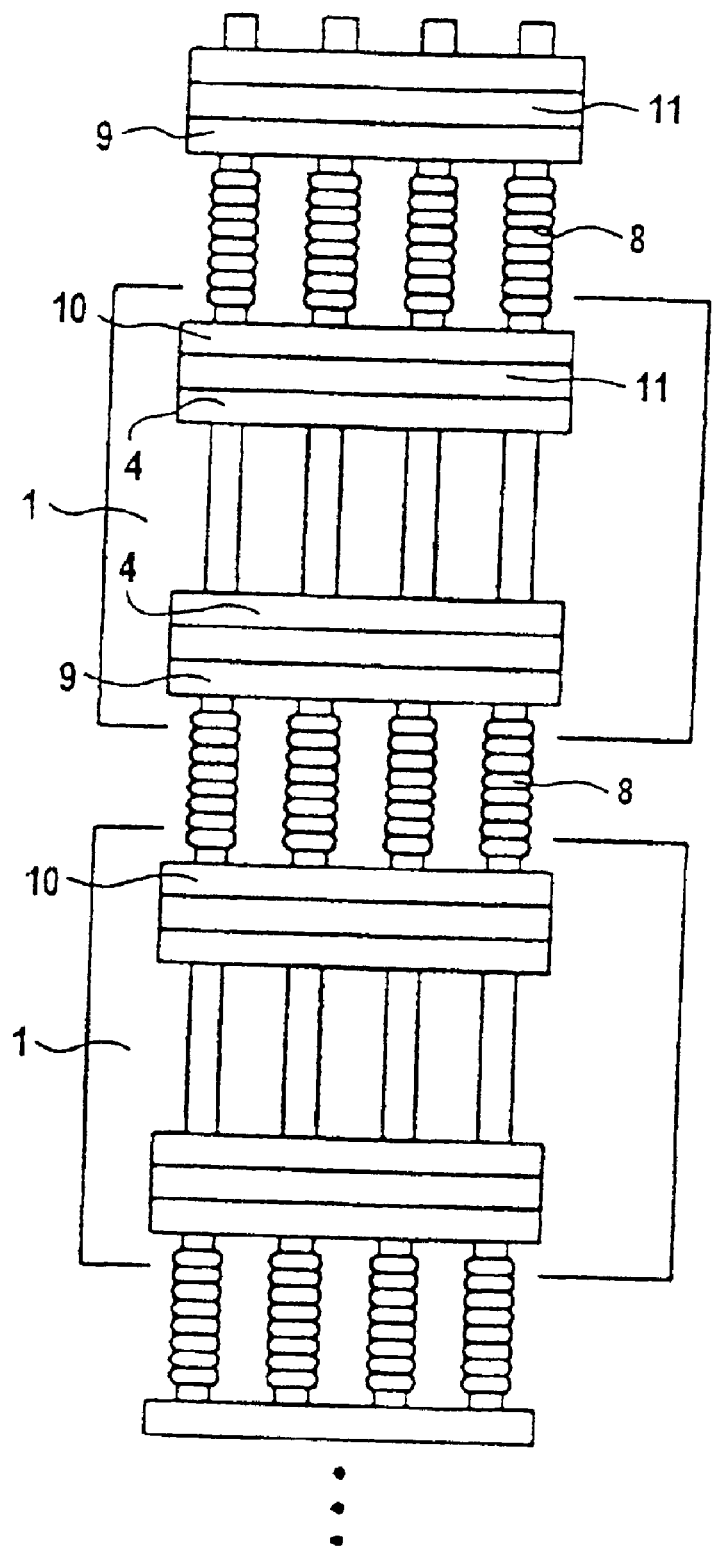
FIG. 4 is a front view showing one of the plant parts according to FIG. 3.

In the exemplary embodiment of FIGS. 3 and 4, identical components in each case bear the same reference symbols. Here, however, the junction block is already in each case integrated into the corresponding end face 30 of the batteries 1. The junction flange plates 5 of FIG. 1 may be, for example, the end faces of a battery housing, the T-pieces 7 (more precisely: the stub lines 61 which merge into the collecting lines 60) already being welded, gastight, to these end plates or cover plates. The coupling flange plates 4, which may likewise carry inside them stub lines (indicated by the broken line 62), may likewise already be integrated into the respective battery, for example welded to a corresponding end plate of the battery housing.

Figure 5:
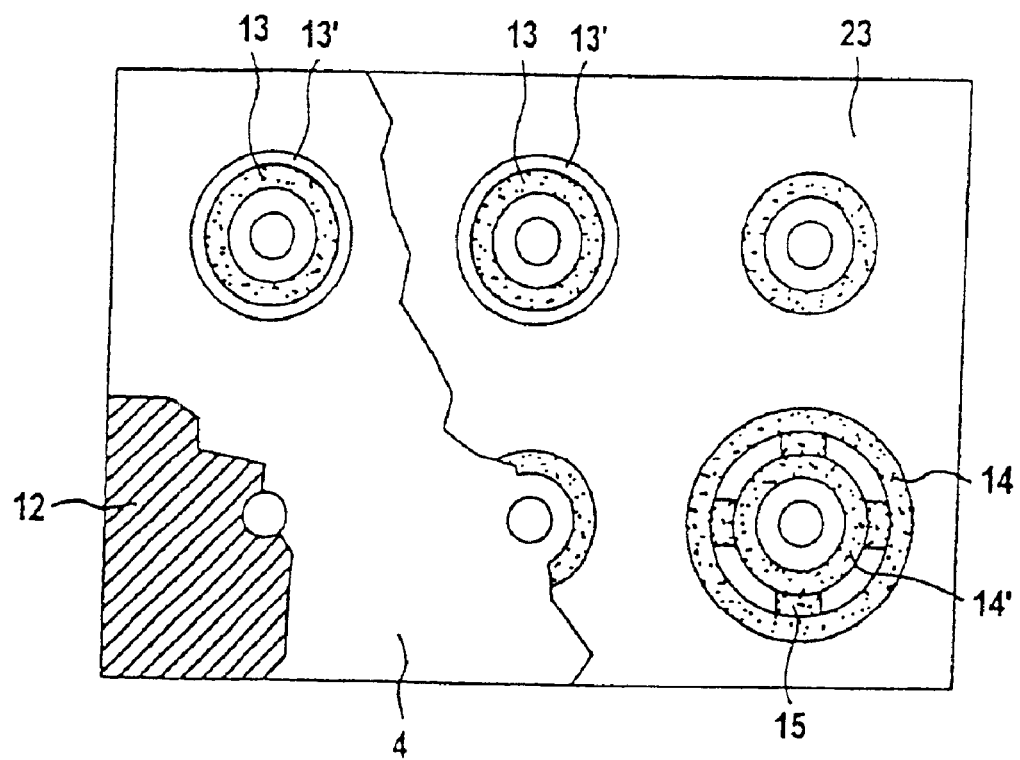
FIG. 5 is a top view showing a flange plate with various sealing elements.

FIG. 5 shows various embodiments of the sealing elements 11. Here, the sealing element 11 may be designed as a flat seal 12 and serve for sealing off all the junction flanges or coupling flanges integrated in a flange plate 4. However, O-ring seals 13, which are inserted in grooves 14 of the flanges or flange plates, may also be used. However, a carrier plate 23 can be inserted between the respective counterflange plate 5, 9, 10. The container plate 23 includes a composite elastomeric material and in which seals are already directly incorporated. These seals may also be vulcanised in or adhesively bonded in on the composite elastomeric materials, so that, even when the components are demounted, the seal does not fall out.

The junctions connect the stub lines 61 to a battery 1 in the junction flange plates 41. The junctions are disposed in a space-saving way in the junction flange plates 41 and the counterflange plates 5, 10, 11. This leads to a particularly compact form of construction of the device.

The diameters of the stub lines 61, 62 are dimensioned, in the junction flanges and flange plates 41 and 5 connected to a battery, to the requirement of the battery connected to them. This prevents overdimensioning of the supply lines 2 for an individual battery and makes distribution to the individual batteries easier.

The diameters of the collecting lines 60 in the junction blocks 3, the connecting elements 8, and the flange plates 42, 43, 9, 10 are dimensioned to the requirement of the entire plant. With an unchanged junction size of the batteries, therefore, influence can be exerted on pressure losses, uniformity of quantity distribution and flow noises by varying sizes in the collecting lines.

Figure 6:
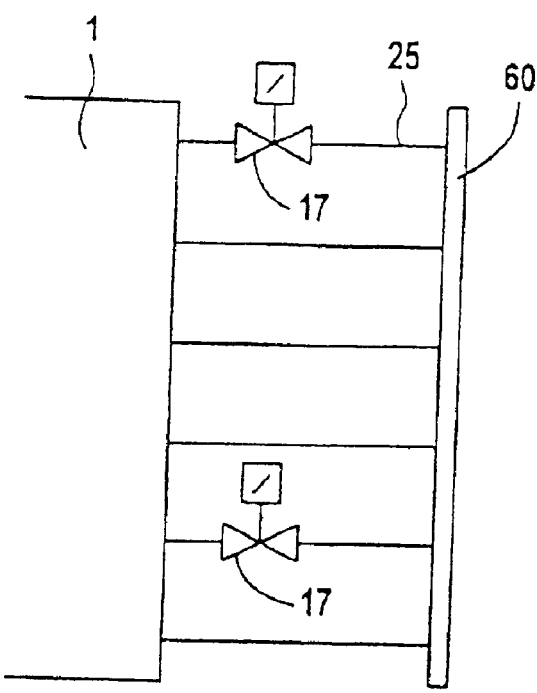
FIG. 6 is a side view showing a fuel cell block/module connected to a flange plate via supply lines.
Figure 7:
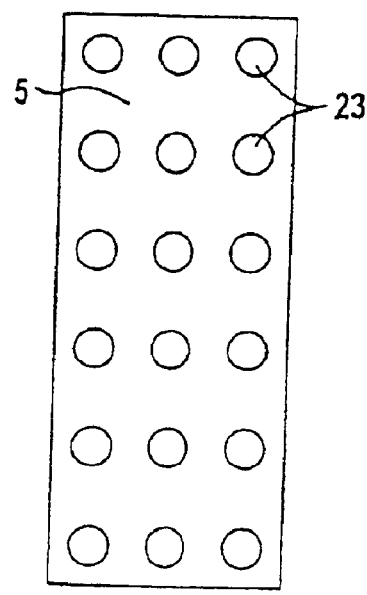
FIG. 7 is a front view showing the flange plate according to FIG. 6.

As may be gathered from FIG. 6, hoses or tubes 25 may be provided between a battery 1 and the collecting lines 60. These may be parts of the stub lines 61, 62 or specific connecting elements which are attached as an extension of the stub lines to the junction flanges. In this embodiment, the flange plate 5 does not bear directly on the battery. In this case, valves 17 are partially installed in stub lines or extensions 25. However, other process engineering apparatuses may be interposed.

Figure 8:
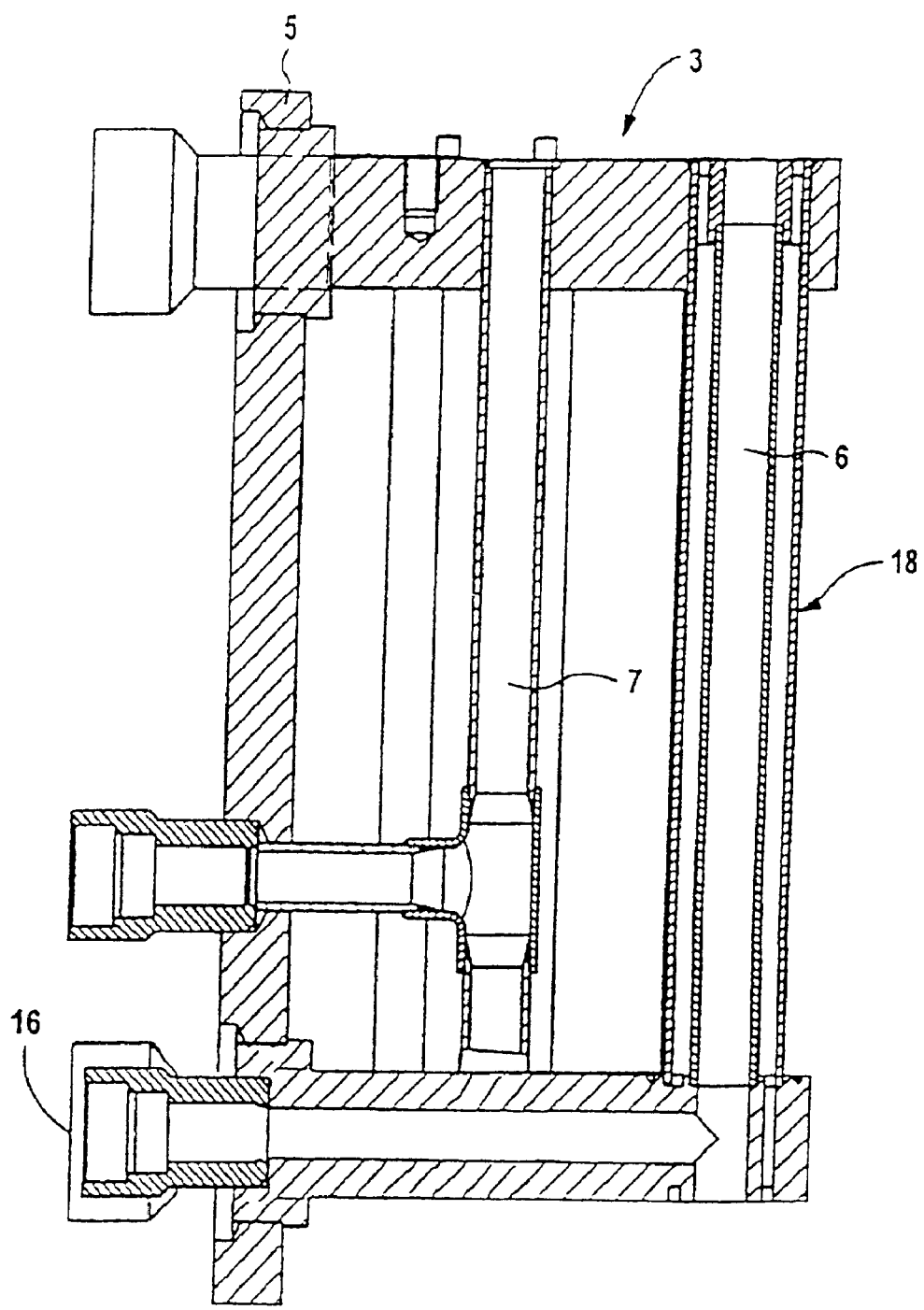
FIG. 8 is a sectional view through a junction block.
Figure 9:
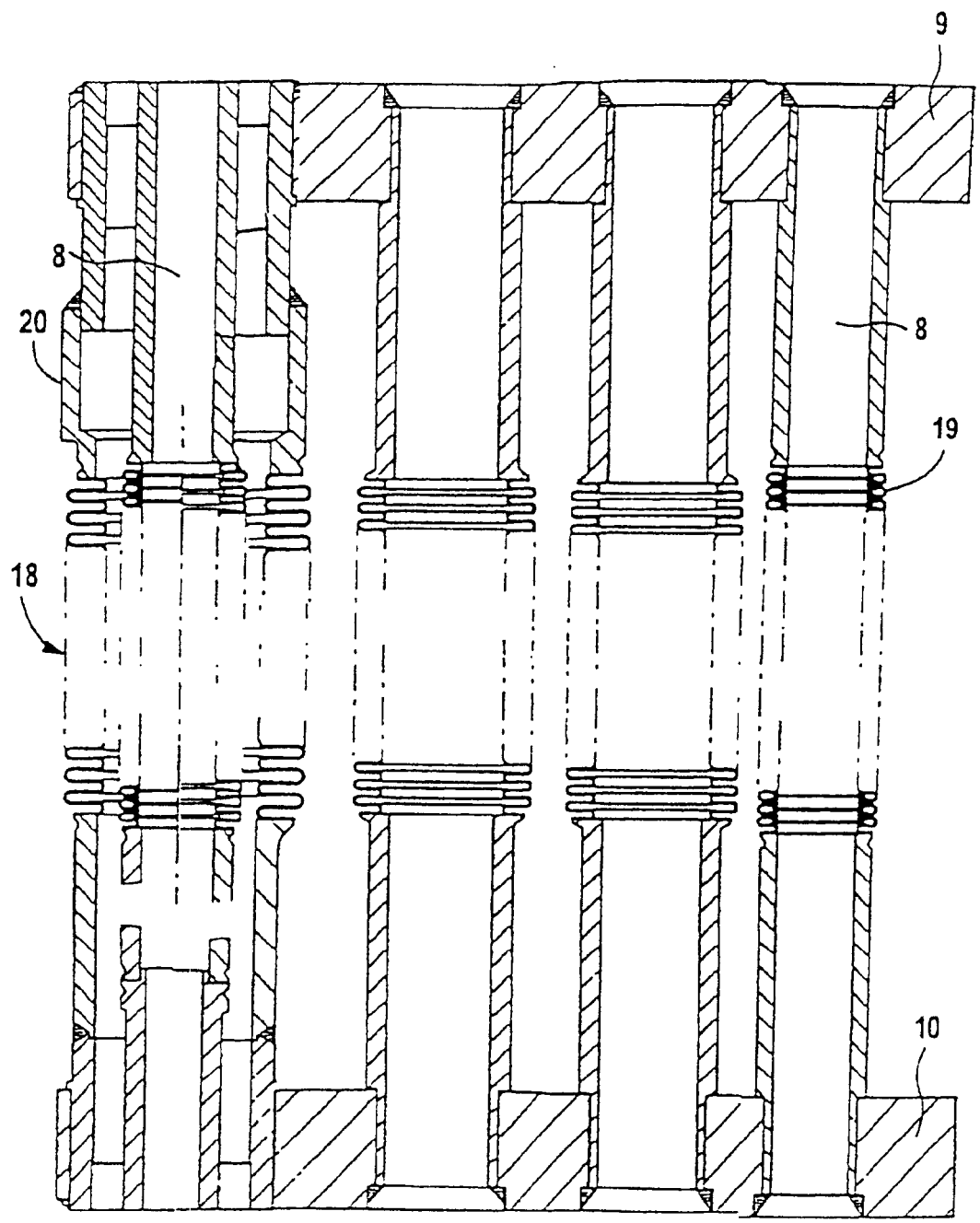
FIG. 9 is a sectional view through the connecting elements and the flange plates provided thereon.

Particularly for hydrogen, the stub lines 61, the collecting lines 60 and, if appropriate, extensions 25 and/or connecting elements 8 are constructed as coaxial double-casing tubes 18 (cf. FIGS. 8 and 9). Since the supply of the fuel cells with hydrogen requires special precautionary measures, the hydrogen is often carried in double-casing tubes 18 in which the outer space is monitored for leakages. These coaxial double-casing tubes 18 can easily be connected to the compact supply system.

These coaxial double-casing tubes 18 require special sealing elements 11 at their ends, however, since at least the inner sealing point has to be partitioned off in relation to the hydrogen. FIG. 5 shows a seal of this type designed with coaxial double-casing tubes 18. This seal includes two coaxially disposed sealing rings 14 and 14', which are connected to webs 15. The webs 15 act as spacers of the two sealing rings 14, 14' and thus ensure a reliable inner sealing point at the connection point.

Figure 10:
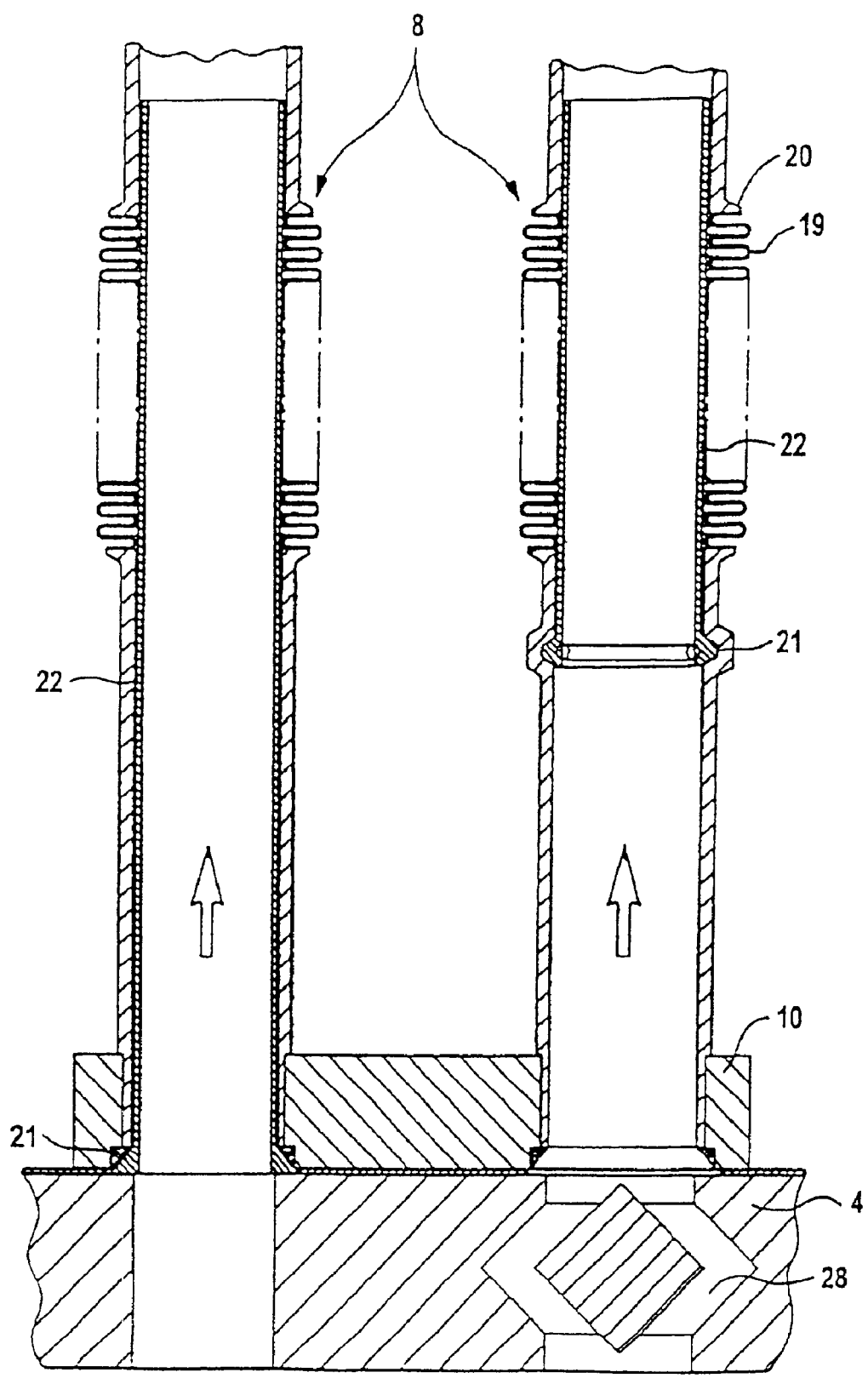
FIG. 10 is a sectional view through lined connecting elements.

FIG. 10 shows two exemplary embodiments of collecting lines, extensions and/or connecting elements in which the flow noise is particularly reduced. In one embodiment, a tubular connecting element 8 is at least partially lined with flexible material 22, to be precise at the shafts 19, transitions 20, and offsets 21. The flexible material 22 is in this case designed in such a way that it does not appreciably impair the movability of the flexible connecting element 8. The connecting elements 8 may, particularly in the region of a flange, also be lined completely with flexible material 23 (left embodiment in FIG. 10), in which case the offsets 20 of the sealing points between the connecting element 8 and the junction block 3 are additionally covered. Reliable noise reduction both in the connecting element 8 itself and at the connection point to the junction block 3 thereby takes place, the flexible material 23 lining the connecting element 8 in such a way that a completely smooth flow profile (cf. the depicted arrows) is possible.

The flexible material is, for example, an elastomer that matches the flexibility of the connecting elements 8.

It is also possible for self-closing equipment, indicated merely diagrammatically as nonreturn valves 28 (FIG. 10), to be provided in the stub lines 61 and/or the connecting elements 8, in particular in the flange plates 41, 5 or 9 or similar elements. This self-closing equipment serves, during demounting, for closing the media path and thereby, for example, preventing an outflow of cooling water or a release of gas.

We claim:

1. A device for interconnecting first and second fuel cell batteries, comprising:

junction blocks each assigned to a respective one of said batteries, each of said junction blocks including a collecting line with ends, a stub line having a free end and leading to said collecting line and a junction flange at said free end of said stub line;

first coupling flanges, each disposed at one of said ends of said collecting line of a respective one of said blocks;

second coupling flanges each disposed at the other of said ends of said collecting line of a respective other of said blocks; and flexible connecting lines each coupling one of said first coupling flanges to one of said second coupling flanges.

2. The device according to claim 1, wherein said stub line has a diameter dimensioned relative to a capacity of the battery.

3. The device according to claim 2, wherein said collecting line has a diameter depending on a capacity of an entire plant.

4. The device according to claim 1, including equipment for monitoring the batteries inserted into the stub lines, said equipment being selected from the group consisting of valves, measuring instruments, and processing engineering equipment.

5. The device according to claim 1, wherein each junction block has, for each process medium of the batteries, a specific collecting line with a free end and a stub line issuing into said collecting line, a junction flange at a free end of the stub line, and a first coupling flange at said first end of said collecting line.

6. The device according to claim 5, wherein a plurality of said junction flanges of a block are combined into a flange plate.

7. The device according to claim 1, wherein a plurality of said coupling flanges of a block are combined into a flange plate.

8. The according to claim 1, wherein said flexible connecting line is a connecting line of flexible length.

9. The device according to claim 8, wherein said flexible connecting line is at least partially wave shaped.

10. The device according to claim 1, wherein said flexible connecting line is at least partially wave shaped.

11. The device according to claim 1, wherein:
at least one of said flanges has a groove formed therein; and
a sealing element as inserted into said groove.

12. The device according to claim 11, wherein said sealing element is a flat seal.

13. The device according to claim 11, wherein said sealing element is an O-ring.

14. The device according to claim 1, including:
a carrier plate formed from composite elastomeric material; and
sealing elements of a plurality of coupling flanges each being integrated into said carrier plate.

15. The device according to claim 1, including:
a carrier plate formed from composite elastomeric material; and
sealing elements of a plurality of junction flanges each integrating into said carrier plate.

16. The device according to claim 1, wherein said collecting line is a double-casing tube.

17. The device according to claim 16, wherein said double-casing tube supplies a process medium to said junction block.

18. The device according to claim 16, including:
webs; and
two coaxially disposed sealing rings connecting to said webs and being carried by said coupling flange at said end of said collecting line.

19. The device according to claim 1, wherein said stub line is a double-casing tube.

20. The device according to claim 19, wherein said double-casing tube supplies a process medium to said junction block.

21. The device according to claim 19, including:
webs; and
two coaxially disposed sealing rings connecting to said webs and being carried by said junction flange at said free end of said stub line.

22. The device according to claim 1, including a flexible material at least partially lining said connecting line.

23. The device according to claim 22, wherein said flexible material is an elastomer.

24. The device according to claim 1, including self-closing equipment in said collecting line.

25. The device according to claim 1, including self-closing equipment in said stub line.

26. The device according to claim 1, including self-closing equipment in said connecting element.

27. The device according to claim 1, including self-closing equipment in said junction flange.

28. The device according to claim 1, including self-closing equipment in said coupling flange.

29. A plant, comprising:
first and second fuel cell batteries;
junction blocks each assigned to one of said fuel cell batteries;
collecting lines, one of said collecting lines being in each of said respective junction blocks, and each of said collecting lines having two ends;
stub lines, one of said stub lines being assigned to each collecting line and leading from said respective collecting line to said respective fuel cell battery;
first coupling flanges, one of said first coupling flanges being assigned to a first end of a connecting line and connecting to one end of said respective collecting line;
second coupling flanges, one of said second coupling flanges being assigned to a second end of the connecting line; and
a flexible connecting line coupling said first coupling flange of said first fuel cell battery to said second coupling flange of said second fuel cell battery.

30. The plant according to claim 29, wherein a diameter of at least one of said stub lines is dimensioned with regard to a capacity of said respective fuel cell battery.

31. The plant according to claim 30, wherein said diameter of at least one of said stub lines is dimensioned with regard to a plant capacity.

32. The plant according to claim 29, including a valve inserting into at least one of said stub lines.

33. The plant according to claim 29, including a measuring instrument inserted into at least one of said stub lines.

34. The plant according to claim 29, including process engineering equipment inserting into at least one of said stub lines.

35. The plant according to claim 29, including respective end faces, one of said respective end faces being disposed on at least a plurality of said fuel cell batteries for receiving every junction for a process media of said respective fuel cell battery, said respective junction blocks of said fuel cell batteries integrating into said end faces.

36. The plant according to claim 29, wherein:
at least one of said stub lines has an end;
a junction is on said corresponding fuel cell battery; and
a junction flange connects said junction to said end of said stub line.

37. The plant according to claim 36, including a flange plate integrating said junction flanges of a plurality of stub lines of a block.

38. The plant according to claim 29, including a flange plate integrating said coupling flanges of a plurality of collecting lines of a block.

39. The plant according to claim 29, including specific collecting lines each with a respective specific stub line for each medium of the fuel cells, every stub line leading to end faces of the fuel cell batteries, and said end faces pointing in an identical direction and carrying every junction for the process media of said fuel cell batteries.

40. The plant according to claim 29, including:
   a further collecting line having an end;
   a first coupling flange at said end;
   a stub line being provided in each block; and
   a plug connection connecting said stub line, of said further collecting line to said corresponding fuel cell battery.

41. The plant according to claim 39, including flexible connecting lines having corresponding specific coupling flanges coupling said flanges of said blocks.

42. The plant according to claim 41, wherein said connecting lines are flexible.

43. The plant according to claim 42, wherein said connecting lines have an at least partially wave-like shape.

44. The plant according to claim 29, wherein:
   said flange has a groove formed therein; and
   a sealing element is inserted into said groove.

45. The plant according to claim 44, wherein said sealing element is a flat seal.

46. The plant according to claim 44, wherein said sealing element is an O-ring seal.

47. The plant according to claim 29, including a carrier plate being formed from composite elastomeric material and integrating sealing elements of a plurality of said coupling flanges.

48. The plant according to claim 29, including a carrier plate being formed from composite elastomeric material and integrating sealing elements of a plurality of junction flanges.

49. The plant according to claim 29, wherein said collecting line is a coaxial double-casing tube.

50. The plant according to claim 49, wherein said collecting line is for carrying a fuel.

51. The plant according to claim 49, including:
   webs; and
   two coaxially disposed sealing rings being connected to said webs and carried by said coupling flange at said end of said collecting line.

52. The plant according to claim 29, wherein said stub line is a coaxial double-casing tube.

53. The plant according to claim 52, wherein said stub line is for carrying a fuel.

54. The plant according to claim 52, including:
   webs; and
   two coaxially disposed sealing rings being connected to said webs and carried by said junction flange at said end of said stub line.

55. The plant according to claim 29, including self-closing equipment in at least one of said collecting lines.

56. The plant according to claim 29, including self-closing equipment in at least one of said stub lines.

57. The plant according to claim 29, including self-closing equipment in at least one of said flexible connecting lines.

58. The plant according to claim 29, including self-closing equipment in at least one of said junction flanges.

59. The plant according to claim 29, including self-closing equipment in at least one of said coupling flanges.

* * * * *